UNITED STATES PATENT OFFICE.

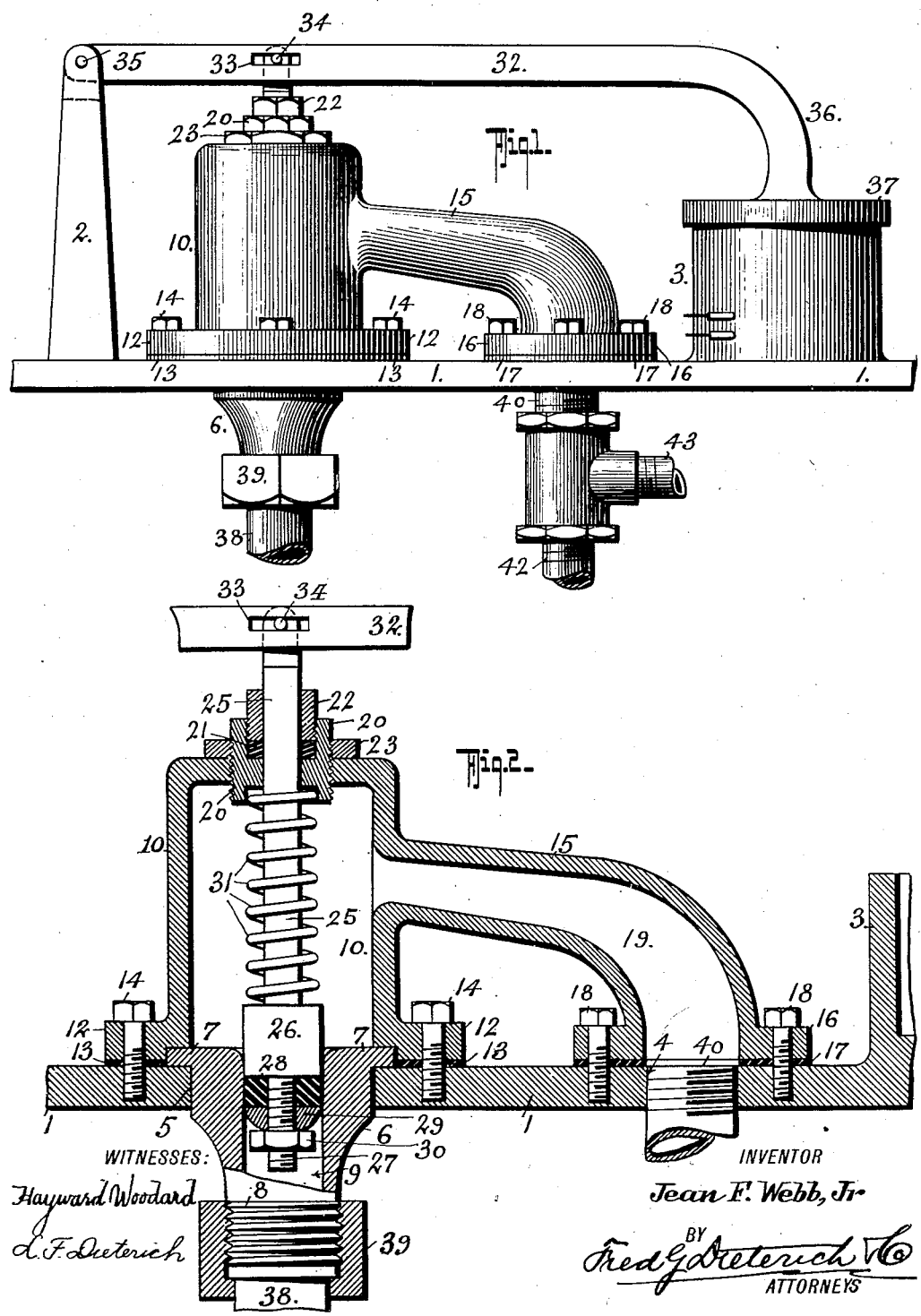

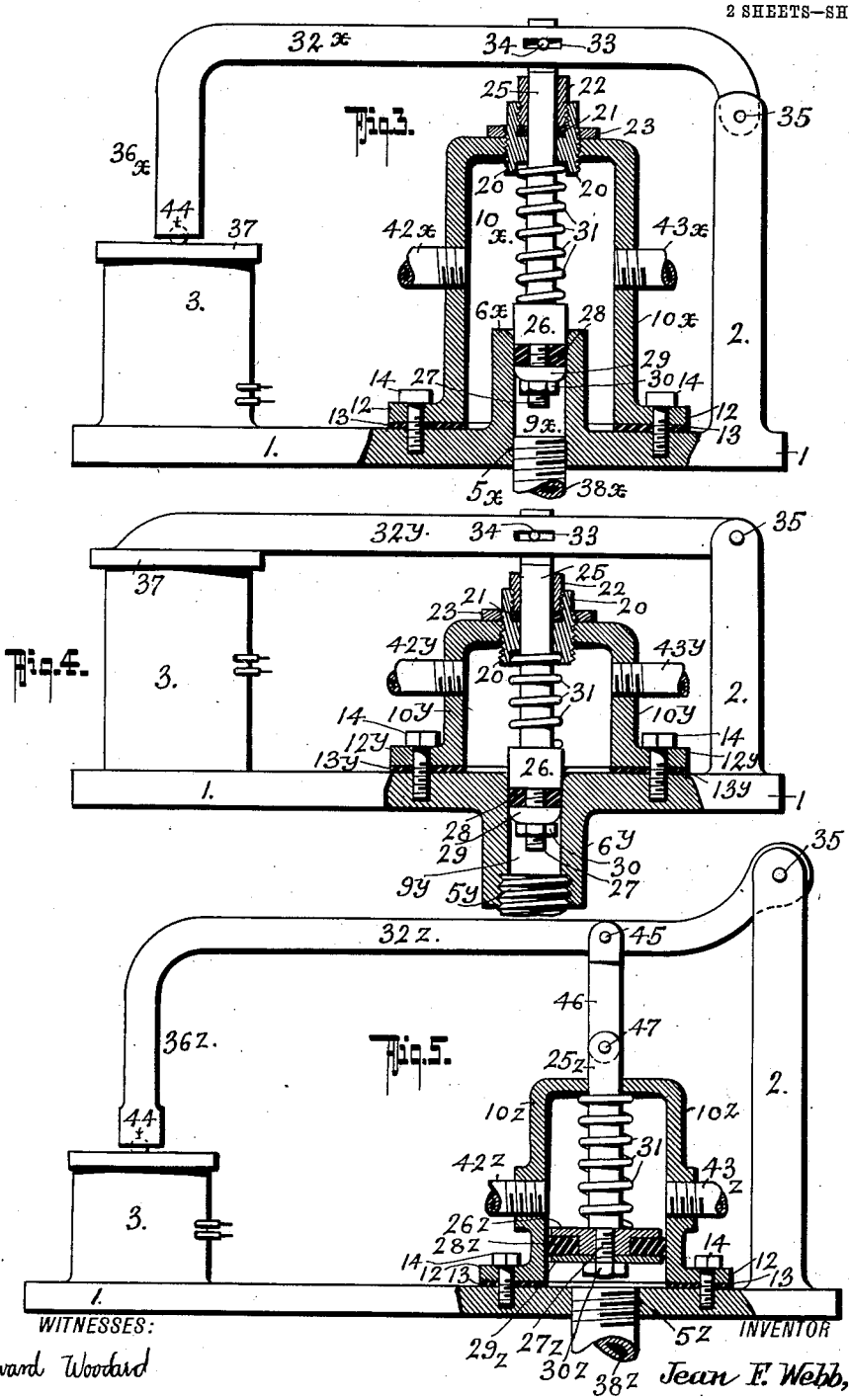

JEAN F. WEBB, JR., OF NEW YORK, N. Y., ASSIGNOR TO THE ELECTRIC SIGNAGRAPH AND SEMAPHORE CO., OF NEW YORK, N. Y., INCORPORATED.

AIR-OPERATED ELECTRICALLY-CONTROLLED VALVE MECHANISM.

948,406.     Specification of Letters Patent.     Patented Feb. 8, 1910.

Original application filed April 7, 1909, Serial No. 488,390. Divided and this application filed August 18, 1909. Serial No. 513,415.

*To all whom it may concern:*

Be it known that I, JEAN F. WEBB, Jr., residing at New York, in the county of New York and State of New York, have invented a new and Improved Air-Operated Electrically - Controlled Valve Mechanism, of which the following is a specification.

My present invention is an improved air operated electrically controlled valve mechanism for use in connection with the air brake system of a train to release the air and set the brakes at predetermined times.

In my co-pending application filed April 7, 1909, Serial No. 488390, I have disclosed the mechanism disclosed in Figures 3 and 5 of this application and in such application above referred to, I have described other species of the general invention and have specifically claimed such other species. Since in such application aforesaid no specific claim could be laid to the specific valve structure shown in Figs. 3 and 5 of this application, the invention claimed in this application relates to the specific construction of the valve part of the mechanism *per se*, and in combination with an electromagnetic lever controlling device therefor, broadly. The specific subject matter shown in Figs. 3 and 5 is therefore divided from such application aforesaid.

The invention desired to be covered herein resides, broadly speaking, in the provision of an air brake valve mechanism of the type stated wherein a valve casing, having an inlet and outlet ports has communication between such ports controlled by the movement of a particular type of valve, to wit,— a piston valve.

The invention also lies in those novel details of construction, combination and arrangement of parts, all of which will be fully described, then be specifically pointed out in the appended claims, reference being had to the accompanying drawings, in which:—

Fig. 1, is a side elevation of the preferred form of the invention. Fig. 2, is an enlarged central vertical longitudinal section and part elevation of the valve proper, *per se*. Fig. 3, is a central vertical longitudinal section and part elevation of a different form of the invention. Fig. 4, is a view similar to Fig. 3 of another slightly modified form. Fig. 5, is a view similar to Figs. 3 and 4 of another form.

Referring now to the accompanying drawings, in which like numerals and letters of reference indicate like parts in all the figures, 1 is the base which has a forked standard 2 near one end and an iron clad electromagnet 3 at the other end. The base 1 also has a tapped hole 4 to receive an outlet pipe 40 and a second hole 5 to receive a nipple 6, the nipple 6 having a flange 7 to rest on the base 1, and having a threaded end 8 to receive the union nut 39 that secures the pipe 38 to the nipple. The pipe 38, in practice, connects to the train pipe of an air brake system (not shown). The nipple 6 has a smooth bore 9.

A valve casing 10 having a seat to receive the flange 7 is fitted over the bushing 6 and is secured to the base in an air tight manner by screws 14 that project through the flange 12 of the casing and through the interposed washer 13. The casing 10 has an outlet that delivers into the passage 19 of an arm 15, whose flange 16 is bolted at 18 to the base 1 over the hole 4, an interposed washer 17 effecting an air tight joint.

A piston valve formed of a head 26, a packing 28, a threaded minor stem 27, a washer 29 and a nut 30 works in the bore 9 of the nipple 6 in the form of the invention shown in Figs. 1 and 2. This valve has its major stem 25 arranged to project through a gland formed of a gland nut 20 tapped into the head of the casing 10 and chambered and tapped to receive the packing 21 and a packing nut 22. A jam nut 23 locks the gland 20 in place.

A spring 21 may be provided, if desired, to assist in maintaining the piston valve in its seat.

The stem 25 at its outer end is adapted to connect with the lever 32, a pin 34 passing through the slot 33 in the lever 32 and through the end of the stem 25 to connect the parts together. The lever 32 is pivoted at 35 to the standard 2 and carries an armature 37 at its free end 36 to coöperate with the magnet 3 and hold the passage through the valve from the inlet to the outlet port, closed.

A T is usually connected to the pipe 40, in practice, to join with the pipe 42 to atmosphere and the pipe 43 to a signal whistle (not shown).

The construction shown in Fig. 3 differs only in detail from that shown in Figs. 1 and 2, principally in that the nipple 6$^x$ is integral with the base 1 and projects up into the valve casing 10$^x$. In this form also the casing 10$^x$ has two outlet ports, with one of which the "to atmosphere" pipe 42$^x$ joins, while the pipe "to whistle" 43$^x$ joins with the other port. In this form also, a swivel connection 44 is shown between the armature 37 and the end 36$^x$ of a lever 32$^x$.

All parts of modified design which correspond in purpose and function in Fig. 3 with similar parts in Figs. 1 and 2 bear the same reference numbers with the index $^x$ added, while those parts which are identical bear the same reference letter in all of the figures.

Fig. 4 differs from the preceding figures in only one essential detail, namely the nipple 6$^y$ is integral with the base 1 as in Fig. 3 but projects below the base 1 as in Figs. 1 and 2. Corresponding parts of slightly different design but performing the same function as the parts in the preceding figures bear the index letter $^y$ in Fig. 4.

Fig. 5 differs from the other figures in that the nipple 6—6$^x$ or 6$^y$ is dispensed with and the piston valve operates in connection with the wall of the casing 10$^z$ to control passage between the inlet and outlet ports of the casing 10$^z$. The valve stem 25$^z$, also, is linked to the lever 32$^z$ by a link 46 that is pivoted at 45 to the lever and at 47 to the stem. The gland at the top of the casing 10$^z$ may also be omitted. Parts having similar functions to those of the form shown in the preceding figures but of modified design bear the index letter $^z$ in Fig. 5.

The spring 31 may be used or omitted as may be found desirable in practice and the armature may be fixed to or movably connected with the respective lever without departing from the invention.

Other slight changes in the details of construction may also be made, as will be readily apparent to those skilled in the art to which the invention appertains.

Having thus described my invention, what I claim is:

1. An air operated electrically controlled valve mechanism for air brake systems, comprising a valve casing having an inlet and an outlet port, a piston valve controlling the passage of fluid between said ports, and electromagnetic devices for holding said valve against fluid pressure.

2. An air operated electrically controlled valve mechanism, comprising a valve casing having an outlet port, a piston valve preventing passage of fluid to said outlet port, means for establishing a fluid pressure against said valve within said casing, and electromagnetic lever devices for holding said valve against said fluid pressure.

3. A valve casing having an outlet port and an inlet port, a piston valve controlling communication between said ports, a lever connected to the stem of said valve, and an electromagnetic device coöperating with said lever to hold said valve in one position, substantially as shown and described.

4. A valve casing having an outlet port and means for establishing a fluid pressure directed toward said outlet port, a piston valve controlling the passage of the fluid toward said outlet port, and means for holding said valve against said fluid pressure.

5. A valve casing having an outlet port and means for establishing a fluid pressure directed toward said outlet port, a piston valve controlling the passage of the fluid toward said outlet port, means for holding said valve against said fluid pressure and electromagnetic devices also for holding said valve against said fluid pressure.

6. A base having a hole, a nipple held in said hole, a valve casing held over said nipple, said nipple having a bore, and said casing having an outlet port, a piston valve operating in said casing and said nipple bore, and said piston valve having a stem projected through said casing.

7. A base having a hole, a nipple held in said hole, a valve casing held over said nipple, said nipple having a bore, and said casing having an outlet port, a piston valve operating in said casing and said nipple bore, said piston valve having a stem projected through said casing, and means effecting an air tight passage for said stem through said casing.

8. A base having a hole, a nipple held in said hole, a valve casing held over said nipple, said nipple having a bore, and said casing having an outlet port, a piston valve operating in said casing and said nipple bore, said piston valve having a stem projected through said casing, means effecting an air tight passage for said stem through said casing, and electromagnetic devices for holding said valve in one position.

9. A base having a hole, a nipple held in said hole, a valve casing held over said nipple, said nipple having a bore, and said casing having an outlet port, a piston valve operating in said casing and said nipple bore, said piston valve having a stem projected through said casing, means effecting an air tight passage for said stem through said casing, and electromagnetic devices for holding said valve in one position, together with mechanical means for assisting said electromagnetic devices.

10. A base having a hole, a nipple projected through said hole and connectible with a train pipe of an air brake system, said nipple having a bore, a casing held over said nipple, a piston valve operating in said casing and the bore of said nipple, said casing having an arm provided with a passage forming an outlet for the casing, said base having a second hole and means for securing said arm over said second hole, and an off take pipe from said second hole.

11. A base having a hole, a nipple projected through said hole and connectible with a train pipe of an air brake system, said nipple having a bore, a casing held over said nipple, a piston valve operating in said casing and the bore of said nipple, said casing having an arm provided with a passage forming an outlet for the casing, said base having a second hole and means for securing said arm over said second hole, an off-take pipe from said second hole, and electromagnetic devices for holding said valve in one position.

12. A base having a hole, a nipple projected through said hole and connectible with a train pipe of an air brake system, said nipple having a bore, a casing held over said nipple, a piston valve operating in said casing and the bore of said nipple, said casing having an arm provided with a passage forming an outlet for the casing, said base having a second hole, an off-take pipe from said second hole, and electromagnetic devices for holding said valve in one position, said electromagnetic devices including a lever, said valve having a stem projected through said casing and pivoted to said lever, an electromagnet and an armature carried by said lever to coöperate with said magnet.

JEAN F. WEBB, Jr.

Witnesses:
CHARLES M. KENNEDY,
LORENZO E. STIPLER.